(12) United States Patent
Fotland

(10) Patent No.: US 7,822,950 B1
(45) Date of Patent: Oct. 26, 2010

(54) THREAD CANCELLATION AND RECIRCULATION IN A COMPUTER PROCESSOR FOR AVOIDING PIPELINE STALLS

(75) Inventor: David A Fotland, San Jose, CA (US)

(73) Assignee: Ubicom, Inc., San Jose, CA (US)

( * ) Notice: Subject to any disclaimer, the term of this patent is extended or adjusted under 35 U.S.C. 154(b) by 790 days.

(21) Appl. No.: 10/350,149

(22) Filed: Jan. 22, 2003

(51) Int. Cl.
*G06F 9/00* (2006.01)

(52) U.S. Cl. ........................ 712/216; 712/220

(58) Field of Classification Search ................ 712/228, 712/219, 226, 201, 216, 220
See application file for complete search history.

(56) References Cited

U.S. PATENT DOCUMENTS

| | | | |
|---|---|---|---|
| 4,110,831 A | 8/1978 | Langdon, Jr. | |
| 4,777,587 A | 10/1988 | Case et al. | |
| 4,821,187 A | 4/1989 | Ueda et al. | |
| 4,825,355 A | 4/1989 | Kurakazu et al. | |
| 4,939,735 A | 7/1990 | Fredericks et al. | |
| 5,163,146 A | 11/1992 | Antanaitis, Jr. et al. | |
| 5,179,672 A | 1/1993 | Genduso et al. | |
| 5,247,636 A | 9/1993 | Minnick et al. | |
| 5,260,703 A | 11/1993 | Nguyen et al. | |
| 5,317,701 A | 5/1994 | Reininger et al. | |
| 5,361,337 A * | 11/1994 | Okin ...................... | 712/228 |
| 5,392,435 A | 2/1995 | Matsui et al. | |
| 5,404,469 A | 4/1995 | Chung et al. | |
| 5,410,658 A | 4/1995 | Sawase et al. | |
| 5,430,884 A | 7/1995 | Beard et al. | |
| 5,515,538 A | 5/1996 | Kleiman | |
| 5,524,250 A * | 6/1996 | Chesson et al. ............ | 712/228 |
| 5,553,305 A * | 9/1996 | Gregor et al. ............. | 718/106 |
| 5,655,133 A | 8/1997 | Dupree et al. | |
| 5,727,211 A | 3/1998 | Gulsen | |
| 5,761,470 A | 6/1998 | Yoshida | |
| 5,865,624 A | 2/1999 | Hayashigawa | |
| 5,867,725 A | 2/1999 | Fung et al. | |
| 5,907,694 A | 5/1999 | Suzuki et al. | |
| 5,933,627 A * | 8/1999 | Parady ...................... | 712/228 |
| 5,933,650 A | 8/1999 | van Hook et al. | |
| 5,944,816 A | 8/1999 | Dutton et al. | |

(Continued)

FOREIGN PATENT DOCUMENTS

WO  WO 99/21081 A1  4/1999

(Continued)

OTHER PUBLICATIONS

Lindsay, S.K. and Preiss, B.R.; On the performance of a multi-threaded RISC architecture; Sep. 1993. Electrical and Computer Engineering, vol. 1, 369-372.*

(Continued)

*Primary Examiner*—Alford W Kindred
*Assistant Examiner*—Benjamin P Geib
(74) *Attorney, Agent, or Firm*—Fenwick & West LLP

(57) ABSTRACT

The present invention provides a computer pipeline control mechanism enabling a nonstalling pipeline despite the presence of pipeline hazards. The present invention detects the presence of predetermined pipeline hazard conditions, cancels the thread which contains the instruction encountering such pipeline hazard and then recirculates the program counter of the instruction having hazards for re-execution. The present invention guarantees the deterministic execution of threads in a computer pipeline.

16 Claims, 3 Drawing Sheets

U.S. PATENT DOCUMENTS

| | | | |
|---|---|---|---|
| 6,009,505 | A | 12/1999 | Thayer et al. |
| 6,016,542 | A * | 1/2000 | Gottlieb et al. ............. 712/228 |
| 6,026,503 | A | 2/2000 | Gutgold et al. |
| 6,061,710 | A * | 5/2000 | Eickemeyer et al. ........ 712/228 |
| 6,076,157 | A | 6/2000 | Borkenhagen et al. |
| 6,085,215 | A | 7/2000 | Ramakrishnan et al. |
| 6,163,839 | A * | 12/2000 | Janik et al. .................. 712/219 |
| 6,314,511 | B2 | 11/2001 | Levy et al. |
| 6,317,774 | B1 | 11/2001 | Jones et al. |
| 6,366,998 | B1 | 4/2002 | Mohamed |
| 6,374,286 | B1 | 4/2002 | Gee et al. |
| 6,378,018 | B1 | 4/2002 | Tsern et al. |
| 6,385,713 | B2 | 5/2002 | Yung |
| 6,421,701 | B1 | 7/2002 | Elnozahy |
| 6,460,116 | B1 | 10/2002 | Mahalingaiah |
| 6,493,741 | B1 | 12/2002 | Emer et al. |
| 6,542,991 | B1 | 4/2003 | Joy et al. |
| 6,567,839 | B1 | 5/2003 | Borkenhagen et al. |
| 6,684,342 | B1 | 1/2004 | Szeto et al. |
| 6,694,425 | B1 * | 2/2004 | Eickemeyer ................ 712/216 |
| 6,718,360 | B1 | 4/2004 | Jones et al. |
| 6,725,355 | B1 | 4/2004 | Imamura |
| 6,728,722 | B1 | 4/2004 | Shaylor |
| 6,766,515 | B1 | 7/2004 | Bitar et al. |
| 7,010,612 | B1 | 3/2006 | Si et al. |
| 7,047,396 | B1 | 5/2006 | Fotland et al. |
| 7,082,519 | B2 | 7/2006 | Kelsey et al. |
| 2002/0002667 | A1 * | 1/2002 | Kelsey et al. ............... 712/228 |
| 2002/0038416 | A1 | 3/2002 | Fotland et al. |
| 2003/0037228 | A1 | 2/2003 | Kelsey et al. |
| 2003/0110344 | A1 | 6/2003 | Szczepanek et al. |
| 2004/0087839 | A1 | 5/2004 | Raymond et al. |

FOREIGN PATENT DOCUMENTS

WO        WO 99/54813 A1     10/1999

OTHER PUBLICATIONS

Gschwind, et al; High Frequency Pipeline Architecture using the Recirculation Buffer, Mar. 19, 2001, IBM Research Division.*

Nemirovsky, Dr. Mario Daniel; Brewer, Dr. Forrest; and Wood, Dr. Roger C.; DISC: Dynamic Instruction Stream Computer; 1991; ACM; pp. 163-171.

Schwan, Karsten and Zhou, Hongyi; Dynamic Scheduling of Hard Real-Time Tasks and Real-Time Threads; IEEE Transaction on Software Engineering; vol. 18, No. 8; Aug. 1992; pp. 735-748.

8-bit AVR® Microcontroller with 128 K Bytes In-System Programmable Flash—Atmega103/103L—Preliminary; ATMEL; © Atmel Corporation 2000; pp. 1-126.

Binns, P. "A Robust High-Performance Time Partitioning Algorithm: The Digital Engine Operating System (DEOS) Approach," 2001, pp. 1.B.6-1.B.6-12.

Eggers, Susan, Simultaneous Multithreading: A Platform for Next-Generation Prcessors, IEEE Micro, Sep./Oct. 1997, pp. 12-19, 0272/1732/97.

El-Kharashi, et al., Multithreaded Processors: The Upcoming Generation for Multimedia Chips, 1998 IEEE Symposium on Advances in Digital Filtering and Signal Processing, Jun. 5-6, 1998, pp. 111-115.

Intel Corporation, Pentium Processor Family Developer's Manual, vol. 3: Architecture and Programming Manual, 1995, pp. 25-1 and 25-30.

Notification of Transmittal of the International Search Report, PCT/US00/35242, Apr. 27, 2001, 4 pages.

Supplementary European Search Report, EP 00989474, Nov. 23, 2004, 3 pages.

"Clock Signal," Wikipedia, the free encyclopedia, May 9, 2007. pp. 1-2, [online] Retrieved from the Internet<URL:http://en.wikipedia.org/wiki/Clock_signal>.

Shaaban, "Clock Signals & Synchronous Sequential Circuits," Jan. 9, 2002, p. 5.

"Definition of 'Cycle'," Free Online Dictionary of Computing (FOLDOC), Sep. 30, 1997, 1 page.

Stritter, E. et al., "A Microprocessor Architecture for a Changing World: The Motorola 68000," Feb. 1979, IEEE, pp. 43-52.

McCrackin, D. et al., "Using Horizontal Prefetching to Circumvent the Jump Problem", IEEE Transactions on Computers, Nov. 1991, pp. 1287-1291,vol. 40, No. 11.

* cited by examiner

THREAD CANCELLATION AND RECIRCULATION IN A COMPUTER PROCESSOR FOR AVOIDING PIPELINE STALLS

RELATED APPLICATIONS

This application is related to the U.S. patent application Ser. No. 09/888,296, titled "System And Method For Reading And Writing A Thread State In A Multithreaded Central Processing Unit," filed on Jun. 22, 2001, which is incorporated by reference herein in its entirety.

BACKGROUND OF INVENTION

1. Field of the Invention

This invention relates generally to computer processor pipeline control, and more particularly, to a system and method for controlling the pipeline of a multithreaded computer processor to ensure that deterministic execution of the threads is not affected by pipeline hazards.

2. Description of the Related Art

In a pipelined computer processor, pipeline hazards may reduce the performance of software codes. A typical cause of a pipeline hazard is that an instruction needs to use a result that is not yet available from a preceding instruction that is concurrently executed in the same pipeline. In a single-threaded pipeline, a conventional method of resolving the pipeline hazard is to stall the pipeline at the stage holding the instruction until the preceding instruction completes execution and the result is available.

However, this method, if used in a multi-threaded pipeline processor, can affect the real-time performance of other threads in the pipeline. In one application, a pipelined computer processor schedules the execution of two types of threads: hard-real-time (HRT) threads and non-real-time (NRT) threads. HRT threads require that a minimum number of instructions be executed per second to satisfy hard timing requirements, which may be imposed by standards such as IEEE 802.3 (Ethernet), USB, HomePNA 1.1 or SPI (Serial Peripheral Interface). NRT threads are programmed to perform those tasks having no hard timing requirements. Therefore, they can be scheduled in any clock cycle where there are no HRT threads actively running. Since the allocation of execution time for each HRT thread is set and the time required to execute each HRT thread is known, the deterministic performance of HRT threads is affected when the pipeline is stalled to remove the hazard.

Another method of resolving a pipeline hazard is to delay the instruction that encounters a hazard, and to allow other instructions to complete execution before the delayed instruction. However, this method requires complex and costly hardware to implement.

Accordingly, what is needed is a pipeline control mechanism to cope with pipeline hazard in a pipelined computer processor, for example, a multithreaded processor, to ensure deterministic execution of multiple threads. The pipeline control mechanism should also be easy and less expensive to implement than conventional systems.

SUMMARY OF INVENTION

The present invention is a pipeline control mechanism that maintains deterministic execution of multiple threads in a computer processor pipeline. In one embodiment, the present invention provides a nonstalling computer pipeline that does not delay the execution of threads that do not encounter pipeline hazards. When an instruction of a thread encounters a hazard condition, the instruction as well as other instructions in the pipeline belonging to the same thread are annulled. The cancelled instruction's program counter is recirculated to the fetching stage of the pipeline so that the instruction can be later rescheduled and retried for execution.

DESCRIPTION OF THE PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
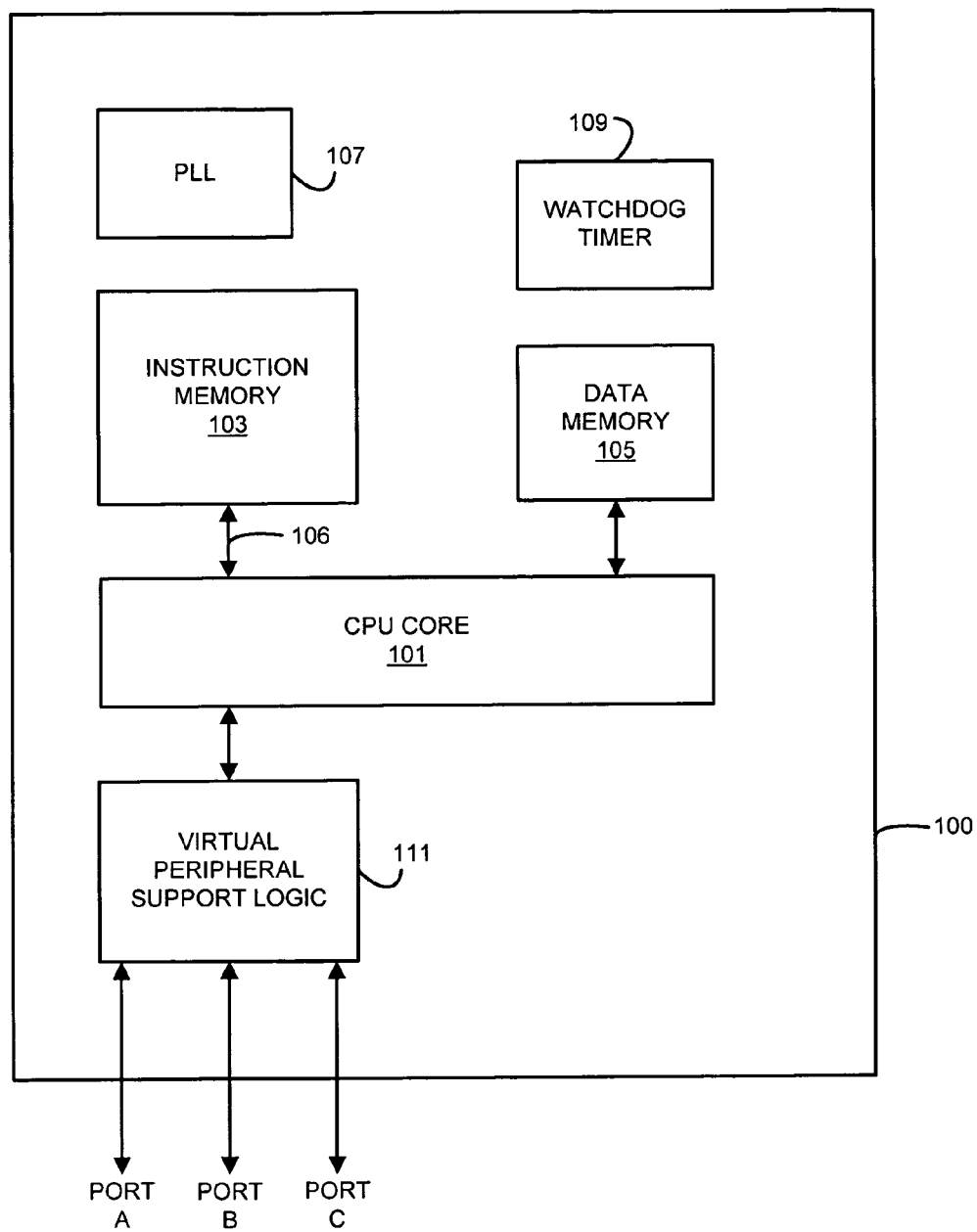
FIG. 1 is a diagram illustrating an embedded processor according to one embodiment of the present invention.

FIG. 1 illustrates an embedded processor 100 according to one embodiment of the present invention. The embedded processor 100 is typically a processor that is used for specific functions, and may have some memory and peripheral functions integrated on-chip. As shown in FIG. 1, the embedded processor 100 includes a RISC CPU core 101 and an instruction memory 103. In addition, the embedded processor 100 can include peripheral blocks, such as a phase locked loop (PLL) 107 or a watchdog timer 109, and input/output (IO) support logic 111, e.g., virtual peripheral support logic. The embedded processor 100 has a pipelined architecture that is capable of executing multiple program threads, as described below.

The CPU core 101 is coupled to the instruction memory 103 through a signal line 106. In one implementation, the instruction memory 103 is a conventional flash memory device. The CPU core 101 can fetch instructions from the flash memory device without experiencing wait-states and without stalling the instruction pipeline. In an alternative embodiment, the instruction memory 103 may also include a conventional SRAM (static RAM) device. Accessing data, e.g., instructions, from SRAM is significantly faster than accessing the same data or instruction from a flash memory device.

In one embodiment, the embedded processor 100 executes multiple instructions from multiple threads in its pipeline simultaneously, each at a different stage. The appearance of concurrent execution of multiple threads is achieved by time-division multiplexing of the processor pipeline between the available threads. The details of conventional computer pipeline processing are known to persons of ordinary skill in the art.

In one preferred embodiment, the embedded processor 100 provides a pipeline control mechanism to guarantee a deterministic execution of threads even though software programmers may not be aware of the impacts of pipeline hazards upon the compiled software threads. As will be described below in detail with reference to FIG. 3, the embedded processor 100 detects if an instruction of a thread encounters a pipeline hazard. Upon the presence of pipeline hazard, the embedded processor 100 can cancel the execution of the instruction encountering the hazard and later instructions in the same thread in the pipeline. The embedded processor 100 will later reschedule execution of the canceled instructions. By doing so, the pipeline operation of the embedded processor 100 will not be stalled and the timing requirements of executing other threads in the pipeline will not be impacted by the hazard.

Figure 2:
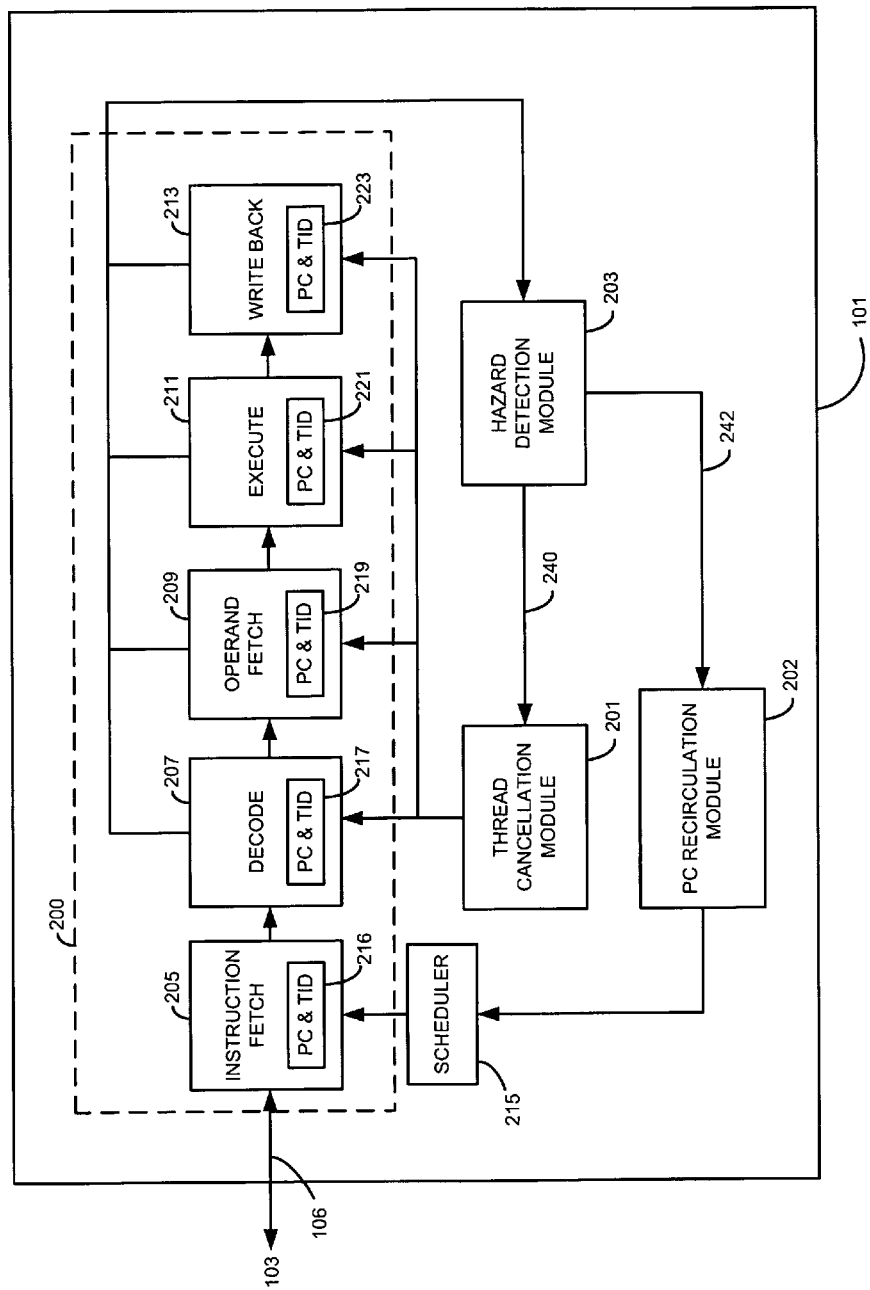
FIG. 2 is a diagram illustrating a RISC core having a recirculating and nonstalling pipeline.

FIG. 2 illustrates a pipelined CPU core 101 according to an embodiment of the present invention. FIG. 2 shows a pipeline 200 running in the CPU core 101 with a plurality of pipeline stages, such as an instruction fetching stage 205, a decoding stage 207, an operand fetching stage 209, an execution stage 211 and a writeback stage 213.

Each stage of the pipeline 200 can be implemented through various hardware, perhaps with associated firmware. For ease of illustration, the pipeline 200 is fairly simple. In alternate embodiments, the pipeline 200 may be longer. For example, in one alternate embodiment, the pipeline 200 includes two stages for each of the fetch, decode, operand fetch, and writeback stages.

The CPU core 101 includes a scheduler 215, a thread cancellation module 201, a program counter recirculation module 202 and a hazard detection module 203. The hazard detection module 203 is coupled to hardware that is used in each pipeline stage 205-213. The thread cancellation module 201 is also coupled to the hardware that is used in each pipeline stage and is coupled to the hazard detection module 203 through a signal line 240. The recirculation module 202 is coupled to the hazard detection module 203 through a signal line 242.

In one embodiment, the scheduler 215 includes a scheduling table where the schedule of HRT threads and NRT threads are provided to fetch corresponding instructions from the instruction memory 103. The scheduler 215 may use a pointer to control which thread is fetched from the instruction memory 103 into the pipeline 200 at the instruction fetch stage 205. In one embodiment, each thread is associated with an independent program counter. The program counter contains identification information for the thread and the address of an instruction in the instruction memory 103 from which the instruction is to be fetched in the next clock cycle and scheduled for that thread. Each time the scheduler 215 instructs to fetch an instruction belonging to a particular thread, the scheduler 215 then obtains a program counter and sends it to the hardware of the CPU core 101 at the fetching stage 205. Additional details about multi-threaded scheduling is set forth in U.S. patent application Ser. No. 09/888,296 that is incorporated by reference herein in its entirety.

After the CPU core 101 fetches an instruction by using a program counter for a particular thread, the program counter value and the thread identification number are kept and saved in registers associated with the instruction while the instruction continues to be processed in different stages of the pipeline 200. As an instruction progresses through the pipeline its program counter and thread identification number are moved or associated with each succeeding pipeline stage. As shown in FIG. 2, the values of the program counters (PCs) and thread identifiers (TIDs) 216-223 correspond to each instruction being held to execute at each stage 205-212.

While the CPU core 101 processes the instructions in its pipeline 200, the hazard detection module 203 monitors each stage of the pipeline 200 and detects whether any instruction encounters a hazard. If the hazard detection module 203 detects the presence of a hazard, it sends a hazard detection signal to the thread cancellation module 201 and the recirculation module 202 via the signal line 240 and 241 respectively. This hazard detection signal includes the pipeline stage and thread identification number, or the program counter value of the instruction or any other information to identify the instruction encountering the hazard and the related instructions. The thread cancellation module 201 then uses this signal to annul the instructions of the thread in the pipeline 200. The cancellation of the instruction having a hazard and all subsequent instructions in the same thread in the pipeline avoids the need for pipeline stalling. As a result, other threads, including HRT threads that are concurrently executed in the pipeline 200, are not affected by the pipeline hazard.

In addition, the recirculation module 202 receives the program counter value of the instruction that encountered the hazard and forwards it to the scheduler 215. The scheduler 215 reschedules the execution of the cancelled instructions beginning with the instruction encountering the hazard.

Figure 3:
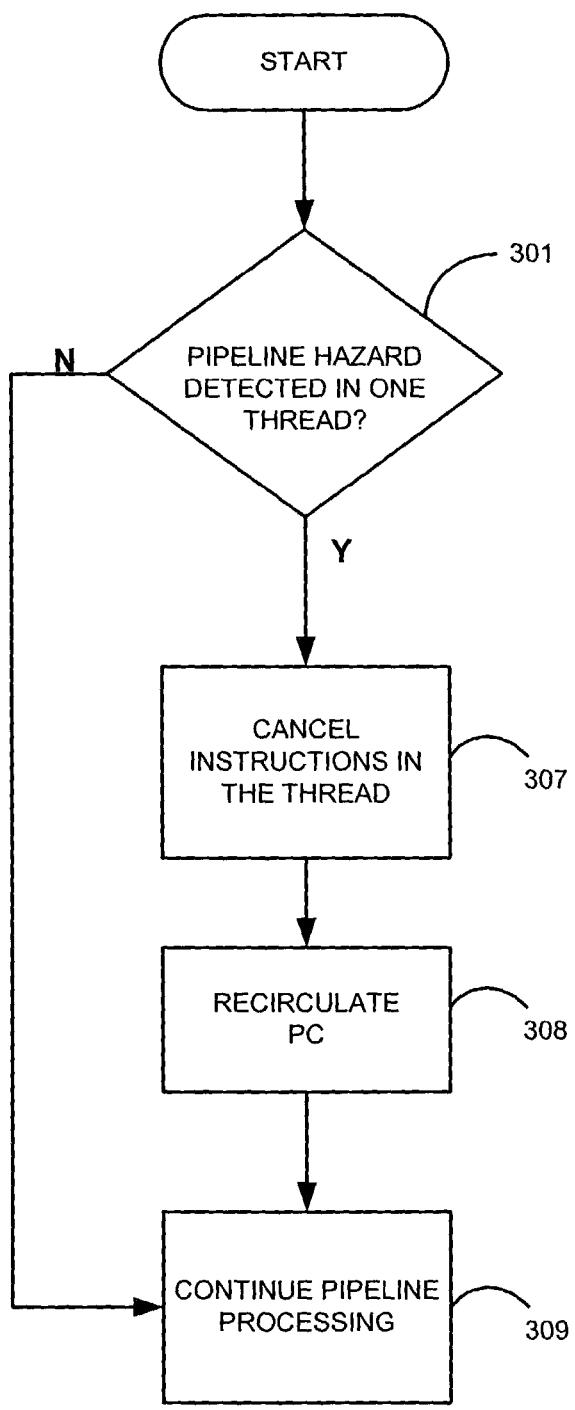
FIG. 3 illustrates a method for controlling a processor pipeline according to one embodiment of the present invention.

FIG. 3 is a flow chart further illustrating a method for imposing the pipeline control according to an embodiment of the present invention.

During the operation of computer processor 100, the hazard detection module 203 detects 301 the presence of pipeline hazard at each stage of the pipeline 200. The techniques of detecting the hazard are well known in the art and may vary depending on types of the software threads. In one example, the hazard detection module 203 may determine that an instruction encounters a hazard condition if its source address is the same as the destination address of a preceding instruction of the same thread. In this scenario, since the preceding instruction may not have been completed, the current instruction cannot obtain the result from the preceding instruction to proceed, i.e., a potential pipeline hazard occurs.

Upon detecting the presence of the pipeline hazard, the hazard detection module 201 deploys a hazard resolution procedure. The hazard detection module 203 sends a hazard detection signal to the thread cancellation module 201. The thread cancellation module 201 then cancels 307 the instruction encountering the hazard and subsequent instructions in the same thread. As indicated above, the hazard detection signal may include the program counter or the pipeline stage and thread identification number associated with the instruction encountering the hazard or the thread can be determined in another manner, e.g., by checking the value stored with the PCs or the TIDs 216-223. In particular, the thread ID specifies to which thread this instruction belongs. The thread cancellation module 201 then uses the thread ID to identify all the instructions in the pipeline 200 that belong to the same thread. In one approach, the thread cancellation module 201 cancels all these instructions by sending an invalidation signal to the hardware at each pipeline stage to disable the operation of the identified instructions. For example, the operands of these instructions will not be fetched or the data to be operated by these instructions will not be latched into data registers. The result of the cancellation is to annul the thread without delaying the pipeline 200. In an alternative embodiment, the invalidation signal does not stop the execution of these instructions in the pipeline 200. Instead, the invalidation signals are used by the thread cancellation module 201 to annul the instructions by preventing the writing back of the results of such instruction during the write back stage of the pipeline 200 and results are also not used by other threads.

While the thread cancellation module 201 cancels the instructions encountering a hazard, the recirculation module 201 also receives the hazard detection signal from the hazard detection module 203 and recirculates 308 the program counter value associated with the cancelled instruction to the scheduler 215. The scheduler 215 retries the cancelled thread by using the program counter value. In one implementation, the scheduler 215 is programmed to recognize the program counter value and to refetch the instructions of the cancelled thread at a new clock cycle. The details of one scheduling process that can be used in accordance with the present invention are described in the U.S. patent application Ser. No. 09/748,098, entitled "System and Method for Instruction Level Multithreading in an Embedded Processor Using Zero-time Context Switching," filed on Dec. 21, 2000, which is incorporated by reference in its entirety.

Accordingly, in the present invention, the real-time performance of other threads is not affected by pipeline hazards and the cancelled thread can also be re-executed. This aids in the deterministic execution of HRT threads.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

The invention claimed is:

1. A method of controlling a computer processor for processing a first and a second thread in a pipeline, each thread having one or more sequential instructions to perform in the pipeline, the method comprising the steps of:
   identifying a first instruction as being part of the first thread using a thread identifier, the first instruction associated with a program counter which includes information identifying the first thread and an address of the first instruction in a memory;
   responsive to said first instruction encountering the presence of a pipeline hazard, retrieving the program counter associated with the first instruction, canceling the first instruction and all subsequent instructions associated with the thread identifier in the pipeline in the first thread before a subsequent instruction from the first thread is processed in the pipeline while continuing to execute instructions from another thread and identifying the second thread from a scheduling table, the scheduling table specifying a predefined temporal order in which the first thread and second thread are retrieved to be processed;
   processing the second thread in the pipeline, wherein instructions of said first and second threads may be simultaneously processed in said pipeline; and
   refetching the cancelled instructions using the program counter and the thread identifier associated with the first instruction to re-execute the cancelled instructions of the first thread in the pipeline while said second thread is processed in said pipeline.

2. The method of claim 1, wherein canceling the instruction encountering the pipeline hazard and all subsequent instructions in the pipeline belonging to the first thread, comprises the step of:
   and
   generating an invalidation signal for the instruction encountering the pipeline hazard and for the subsequent instructions in the pipeline belonging to the first thread.

3. The method of claim 2, wherein the invalidation signal enables an instruction to not store the result of executing the instruction.

4. The method of claim 1, wherein the processing of the second thread continues uninterrupted while the first instruction is cancelled.

5. The method of claim 1, wherein the processing of the second thread is not impacted by the presence of a pipeline hazard in the first thread.

6. The method of claim 2, wherein the invalidation signal annuls the instruction encountering the pipeline hazard and the subsequent instructions in the pipeline belonging to the first thread.

7. The method of claim 2, further comprising sending the invalidation signal to a plurality of pipeline stages in the pipeline.

8. A pipeline computer processor, comprising:
   a memory, for storing instructions multiple software threads to be executed, each thread comprising a plurality of sequential instructions, each instruction associated with a program counter value which includes information identifying a thread associated with an instruction and an address of the instruction in the memory; and
   a processing unit, coupled to the memory, for processing said instructions using multiple threads in a pipeline, wherein the processing unit comprises:
   a scheduler for scheduling instructions to fetch, the scheduler including a scheduling table specifying a predefined temporal order in which the a plurality of threads are retrieved to be processed;
   a hazard detection module, detecting if an instruction encounters a predetermined pipeline hazard condition and generating a hazard detection signal in response to the presence of the pipeline hazard condition, wherein the hazard detection signal includes the program counter value of the instruction encountering the predetermined pipeline hazard condition;
   a thread cancellation module, coupled to the hazard detection module, for canceling the instruction encountering the hazard condition and all subsequent instructions in the same thread before a subsequent instruction in the same thread is processed while continuing to execute instructions from another thread upon receiving the hazard detection signal and for identifying a different thread for processing as the instruction encountering the hazard condition and all subsequent instructions in the same thread are canceled; and
   a recirculation module, coupled to the hazard detection module, for receiving the hazard detection signal and for recirculating the program counter value of the instruction encountering the predetermined pipeline hazard condition to the scheduler, wherein the recirculated program counter value is used by the scheduler to re-execute the instructions of the cancelled thread while said different thread is processed in said pipeline.

9. The computer processor of claim 8, wherein the program counter of the instruction comprises:
   an address of the instruction in the memory; and
   a thread identifier that identifies the thread to which the instruction is associated.

10. A system for controlling a computer processor for processing a first and a second thread in a pipeline, each thread having one or more sequential instructions to perform in the pipeline, the means comprising:

means for identifying a first instruction as being part of the first thread using a thread identifier, the first instruction associated with a program counter which includes information identifying the first thread and an address of the first instruction in a memory;

means for responsive to said first instruction encountering the presence of a pipeline hazard, retrieving the program counter associated with the first instruction, canceling the first instruction and all subsequent instructions associated with the thread identifier in the pipeline in the first thread before a subsequent instruction from the first thread is processed in the pipeline while continuing to execute instructions from another thread and identifying the second thread from a scheduling table, the scheduling table specifying a predefined temporal order in which the first thread and second thread are retrieved to be processed;

means for processing the second thread in the pipeline, wherein instructions of said first and second threads may be simultaneously processed in said pipeline; and means for refetching the cancelled instructions using the program counter and the thread identifier associated with the first instruction to re-execute the cancelled instructions of the first thread in the pipeline while said second thread is processed in said pipeline.

11. The system of claim 10, wherein the means for processing the second thread continue uninterrupted while the first instruction is cancelled.

12. The system of claim 10, wherein the processing of the second thread is not impacted by the presence of a pipeline hazard in the first thread.

13. The system of claim 10, wherein the means for canceling the instruction encountering the pipeline hazard and all subsequent instructions in the pipeline belonging to the first thread, comprises:

means for generating an invalidation signal for the instruction encountering the pipeline hazard and for the subsequent instructions in the pipeline belonging to the first thread.

14. The system of claim 13, wherein the invalidation signal enables an instruction to not store the result of executing the instruction.

15. The system of claim 13, wherein the invalidation signal annuls the instruction encountering the pipeline hazard and the subsequent instructions in the pipeline belonging to the first thread.

16. The system of claim 13, further comprising means for sending the invalidation signal to a plurality of pipeline stages in the pipeline.

\* \* \* \* \*